United States Patent
Vaccarella (10) Patent No.: US 7,311,681 B1
(45) Date of Patent: Dec. 25, 2007

(54) MOTOR VEHICLE MASSAGE SEAT

(76) Inventor: Christalla Vaccarella, 36B Monticello Dr., Whiting, NJ (US) 08759

(*) Notice: Subject to any disclaimer, the term of this patent is extended or adjusted under 35 U.S.C. 154(b) by 88 days.

(21) Appl. No.: 11/451,178

(22) Filed: Jun. 12, 2006

(51) Int. Cl.
*A61H 1/00* (2006.01)

(52) U.S. Cl. .......................... 601/46; 601/49

(58) Field of Classification Search ............... 601/46, 601/47, 49, 53, 54, 67, 69–70, 148
See application file for complete search history.

(56) References Cited

U.S. PATENT DOCUMENTS

| | | | |
|---|---|---|---|
| 2,921,578 | A | 1/1960 | Rabhan |
| 4,422,448 | A | 12/1983 | Sugai et al. |
| 4,465,158 | A | 8/1984 | Yamazaki et al. |
| 6,053,880 | A | 4/2000 | Sleichter et al. |
| 6,068,339 | A | 5/2000 | Linzalone |
| 6,375,630 | B1 | 4/2002 | Cutler et al. |
| 6,676,615 | B2* | 1/2004 | Flick et al. ............ 601/57 |
| 6,682,494 | B1 | 1/2004 | Sleichter, III et al. |
| 6,918,884 | B2 | 7/2005 | Knelsen et al. |
| 7,081,099 | B1* | 7/2006 | Luo .................. 601/86 |
| 2002/0183666 | A1* | 12/2002 | Suh .................. 601/84 |
| 2004/0158176 | A1* | 8/2004 | Park .................. 601/18 |

FOREIGN PATENT DOCUMENTS

| | | |
|---|---|---|
| DE | 4116836 | 11/1992 |
| DE | 199505445 | 8/1996 |
| DE | 19700342 | 7/1997 |
| DE | 199530759 | 11/2000 |
| EP | 1600136 | 11/2005 |
| GB | 809.734 | 3/1959 |
| JP | 2003285676 | 10/2003 |
| JP | 200416287 | 1/2004 |

* cited by examiner

*Primary Examiner*—Michael A. Brown
(74) *Attorney, Agent, or Firm*—Michael I. Kroll (57) ABSTRACT

A motor vehicle seat having massage units positioned therein and controllable by each user including neck, back and seat. Each massage unit is comprised of a housing having rotational and vibratory members therein that when energized extend beyond the housing in an operative position. When powered off the rotational and vibratory members retract into the housing.

19 Claims, 11 Drawing Sheets

MOTOR VEHICLE MASSAGE SEAT

BACKGROUND OF THE INVENTION

1. Field of the Invention

The present invention relates generally to massage devices and, more specifically, to a motor vehicle seat having massage units positioned therein and controllable by each user including neck, back and seat. Each massage unit is comprised of a housing having rotational and vibratory members therein that when energized extend beyond the housing in an operative position. When powered off the rotational and vibratory members retract into the housing.

2. Description of the Prior Art

There are other massage devices designed for seating. Typical of these is U.S. Pat. No. 2,921,578 issued to Rabhan on Jan. 19, 1960.

Another patent was issued to Sugai, et al. on Dec. 27, 1983 as U.S. Pat. No. 4,422,448. Yet another U.S. Pat. No. 4,465,158 was issued to Yamazaki, et al. on Aug. 14, 1984 and still yet another was issued on Apr. 25, 2000 to Sleichter, III as U.S. Pat. No. 6,053,880.

Another patent was issued to Linzalone on May 30, 2000 as U.S. Pat. No. 6,068,339. Yet another U.S. Pat. No. 6,375,630 was issued to Cutler, et al. on Apr. 23, 2002. Another was issued to Sleichter, III et al. on Jan. 27, 2004 as U.S. Pat. No. 6,682,494 and still yet another was issued on Jul. 19, 2005 to Knelson, et al. as U.S. Pat. No. 6,918,884.

Another patent was issued to Fader on Mar. 4, 1959 as U.K. Patent No. GB809,734. Yet another German Patent No. DE4116836 was issued to Ball on Nov. 26, 1992. Another was issued to Wohlrab on Aug. 22, 1996 as German Patent No. DE 19505445 and still yet another was issued on Jul. 24, 1997 to Joachim as German Patent No. DE19700342.

Another patent was issued to Schwarz on Nov. 16, 2000 as German Patent No. DE19930759. Yet another Japan Patent No. JP2003285676 was issued to Tsukagami on Oct. 7, 2004. Another was issued to Takeda, et al. on Jan. 22, 2004 as Japan Patent No. JP2004016287 and still yet another was issued on Nov. 30, 2005 to Hitoshi Omron Healthcare as European Patent Application No. EP1600136.

U.S. Pat. No. 2,921,578

Inventor: Alvin R. Rabhan

Issued: Jan. 19, 1960

In a therapeutic apparatus of the character described, the combination with the frame of a chair back including opposite frame members, of spaced first and second springs bridging said frame members, an electrically-operated vibrator means mounted on the rear of said first and second springs, whereby on actuation of said vibrator means, said first and second springs will vibrate and a third spring positioned between said first and second springs and bridging said opposite frame members; said third spring being associated with said vibrator means and being biased to urge the vibrator means forwardly.

U.S. Pat. No. 4,422,448

Inventor: Haruo Sugai, et al.

Issued: Dec. 27, 1983

A massaging apparatus comprises a pair of massaging wheels obliquely and eccentrically attached to a main shaft, a shifting mechanism for shifting the massaging wheels and main shaft in the direction of the length of a chair back rest or a bed, and a spacing changing mechanism for changing the spacing between the massaging wheels. The apparatus is designed to detect the position of the pair of massaging wheels and the spacing therebetween. It further comprises position selecting switches associated with the neck, shoulders, back and waist of the human body. When any one of these position selecting switches is operated, the shifting mechanism and the spacing changing mechanism as well as the rotative direction of the main shaft are automatically controlled in accordance with the detected shifted position and spacing of the massaging wheels.

U.S. Pat. No. 4,465,158

Inventor: Shinichiro Yamazaki

Issued: Aug. 14, 1984

A vehicle driver's seat is equipped with an electromagnetically operated vibrator arranged in its back-rest to be activated by energization of an electric control circuit for periodically supplying an electric current to the vibrator from a vehicle battery. A safety device for the driver's seat comprises a parking brake switch arranged between the electric control circuit and the battery to be opened during the inoperative condition of a parking brake of the vehicle and to be closed in response to operation of the parking brake, and an additional control circuit for energizing the electric control circuit in response to closing of the switch to activate the vibrator during arrest of the vehicle and for deenergizing the electric control circuit in response to opening of the switch to deactivate the vibrator during movement of the vehicle.

U.S. Pat. No. 6,053,880

Inventor: Charles G. Sleichter, III

Issued: Apr. 25, 2000

A massaging system for equipment such as a vehicle includes a pad; a heater element, and motorized vibrators in respective regions of the pad; a plurality of vibratory transducers for location relative to plural zones of the seat; a controller for selectively activating the transducers. Each of the vibrators is in a cavity of a main cushion member, the cavity being closed by an outer cushion member that supports an occupant, a soft isolation member being interposed between the transducer and the main cushion member. The isolation member can completely enclose the transducer; alternatively, the transducer can be bonded to the outer cushion member or a reinforcing sheet that is laminated thereto, the isolation member only partially enclosing the transducer. The isolation of the vibrators from the main cushion member provides improved selectivity of particular regions of a user's body to be massaged. Also, in multiple seating installations, unwanted vibration of one seat is suppressed during activation of vibrators in an adjacent seat. Also disclosed is a method for converting a padded support to produce isolated massaging.

U.S. Pat. No. 6,068,339

Inventor: Salvatore Linzalone

Issued: May 30, 2000

A vibrating vehicle seat is provided, wherein a vibrating motor is adapted to be installed under the seat of a vehicle.

When installed in a vehicle seat, the vibrating motor receives its power from the battery of the vehicle and the frequency of the vibration is automatically adjusted in proportion to the speed of rotation of the vehicle's engine. There may be a separate manual on/off switch that can additionally control the force of the vibration. A controller box may also be provided with a multiple setting switch to select inputs from 1 to 4 stroke engines, 1 to 8 cylinder engines and 2 to 4 cycle engines. In addition to, or in substitution for, the vibrating motor, passenger stimulation may also be supplied by a rotational massaging ball that will have a moving or a rubbing sensation through the seat in any desired location.

U.S. Pat. No. 6,375,630

Inventor: Stanley Cutler, et al.

Issued: Apr. 23, 2002

A massaging system includes a pad; a heater element, and motorized vibrators in respective regions of the pad; corresponding heater and motor drivers in the pad; a control wand removably connectable to the pad and having a microcontroller with RAM and ROM, a serial EEPROM; a serial interface to a shift register in the pad for signaling pulse width modulation of the drivers. The ROM defines a master set of operating modes and variations thereof in response to operator input of intensity, region, heat input; and mode signals to the controller. The EEPROM has data for implementing and configuring a subset of the master modes. The system can also provide composite modes including a test mode that automatically sequentially activates each mode and variation of the subset of the modes without delays for exercising non-implemented modes. The system can have a power detector for identifying sources of power having different current limitations, the system being operated with PWM duty cycle limiting when raw power voltage falls below a preset level. Also disclosed is a set-up method for writing data to the EEPROM using the serial interface when the wand is disconnected from the pad for facilitating production of a variety of systems with reduced inventory requirements. The system can also include an audio envelope detector having a dual-slope integrating ADC in the pad that is cycled by serial signals driving the shift register, a single comparator output of the ADC signaling the microcontroller.

U.S. Pat. No. 6,682,494

Inventor: Charles G. Sleichter, III

Issued: Jan. 27, 2004

A vehicle massaging system includes a seat pad and motorized vibrators in respective regions of the pad; and a controller for selectively activating the transducers. Each of the vibrators is in a cavity of a main cushion member, the cavity being closed by an outer cushion member that supports an occupant, a soft or resilient isolation device being interposed between the vibrator and the main cushion member for reduced coupling of vibrations to structure or other portions of the seat, but enhanced coupling to a target region of the outer cushion member for improved selectivity of particular regions of a user's body to be massaged, and in multiple seating installations, unwanted vibration of one seat is suppressed during activation of vibrators in an adjacent seat. The transducer is bonded to the outer cushion member or a reinforcing sheet that is laminated thereto, the isolation device contacting a bottom portion of the transducer. Alternatively, the isolation device can completely enclose the transducer. The isolation device can include a flexible sealed enclosure containing a viscous material. An offset plate portion of a housing of the vibrator can extend between a structural member of the seat and the target zone region, a body portion of the vibrator being laterally spaced from the structural member when the structural member would otherwise block desired placement of the vibrator. The heater element can be fire resistant. Also disclosed is a method for converting a padded support to produce isolated massaging, and a method utilizing a subassembly of vibrators and the outer cushion member to facilitate production of the system.

U.S. Pat. No. 6,918,884

Inventor: John Knelsen

Issued: Jul. 19, 2005

A vibrating lumbar support transmits vibrations from an electromagnetic pulse vibrator through a vibration plate, guide rods, an arching pressure surface and then to a seat occupant. The vibrating unit may also transmit vibrations to a seat occupant through a push paddle type lumbar support or through a sinuous wire type lumbar support.

U.K. Patent Number GB809,734

Inventor: Herbert Edward Fader

Issued: Mar. 4, 1959

A vehicle seat with base 6, seat portion 5 and back 2 has the back in the form of a shell 22 of which the front portion consists of a flexible cloth or plastic strip 30 pressed into cyclic protrusion by a roller-tipped pivoted arm 34 having a slot to en-gage a stud 40 on a disc 42 driven by an electric motor 48 so that the roller-tip 32 runs along the inside of strip 30 to massage the back of the occupant of the seat and relieve back fatigue. Rubber washers between shell bottom portion 26 and angle brace 60 reduce vibration transmitted by the motor.

German Patent Number DE4116836

Inventor: Wilfried Ball

Issued: Nov. 26, 1992

The vehicle seat with a massage facility (7) consists of several strips (8a-f, 9a-c, 10a, b, 18) which each constitute a unit (8, 9, 10) for the massage of given parts of the seat occupant's body. An individual module has ball shaped massage elements (11, 12) which can be rotated in either direction by a motor driven endless belt (21). The massage pressure can be varied by altering the pressure plates (29a, b, c). ADVANTAGE—Seat with a mechanism which automatically provides an adjustable massaging effect.

German Patent Number DE 19505445

Inventor: Otmar Wohlrab

Issued: Aug. 22, 1996

A massage mechanism for incorporation in the backrest of upholstered seating or reclining furniture has a baseframe (1) profiled to the contour of the particular item to be fitted. Two sides of the frame (1) are formed by the parallel handed guide rails (2) between which a rectangular carrier (3) is able to move supported on rollers (5) at each of its corners propelled by a traversing motor (7). The carrier (3) transports a massage unit (6) which incorporates a central pair of adjustable massage rollers (9) having a common axis mounted on a spring-loaded pivot arm and two carrier-mounted motors driving modular attachments permit various massage characteristics to be reproduced.

German Patent Number DE 19700342

Inventor: Siegfried Joachim

Issued: Jul. 24, 1997

The massage cushion uses balls which are fixed into pockets which are assembled together to form a cushion which is fixed to car seats etc. The balls are used to produce a massage effect when the user sits in the seat. The user moves himself to gain the desired massage effect or the motion of the vehicle can be sufficient. The device has fixing belts for attaching it to the seat of the car and a cross tension belt is used for the production of a horizontal force.

German Patent Number DE19930759

Inventor: Tobias Schwarz

Issued: Nov. 16, 2000

The vehicle seat is fitted with motor-powered pressure units (5) within the backrest, under the upholstery. They have an eccentric rotation round an axis (7a), with rotating pressure surfaces (5a) to press against the seating cover. The rotating pressure units (5) are within a closed shrouding, with elastic distortion, with a number of pressure units (5) rotating round a common horizontal axis (7a).

Japanese Patent Number JP2003285676

Inventor: Kenji Tsukagami

Issued: Oct. 7, 2003

PROBLEM TO BE SOLVED: To make it possible to easily massage a person sitting on a seat of a vehicle.

SOLUTION: The in-vehicle seat with a massage function has a structure in which the massage function is incorporated into a seat back of the seat, a center portion of a seat pad is made hollow in a longitudinal direction over a long distance, the above portion is made only of a sheet fabric and the rubbing balls a bit protruding relative to the seat pad front face can easily move right and left.

Japanese Patent Number JP2004016287

Inventor: Takeda Takeyuki, et al.

Issued: Jan. 22, 2004

PROBLEM TO BE SOLVED: To provide a massage machine for a vehicle capable of effectively giving a massage to the back of a human body.

SOLUTION: The massage machine is disposed on the front surface of a seat for massaging the back of a user sitting on the seat. The massage machine has a built-in massage unit 3 for massaging the shoulder in the upper part of the machine, and a built-in massage unit 3 for massaging the waist in the lower part. In addition, an angle setting member 11 whose cross section is a wedge-shaped for making each massage unit 3 rightly face the back of the user behind the massage unit 3. Because of the presence of the angle setting member 11, each massage unit 3 can be made to rightly face the shoulder or the waist of the user.

European Patent Application Number EP 1600136

Inventor: Hitoshi Omron Healthcare

Published: Nov. 30, 2005

Provided is a massaging machine (1) with a cover construction improved on design and maintenance with a suppressed cost. A massaging machine (1) is provided with a back rest portion (2) and a seat portion (3). The backrest portion (2) includes: a backrest base (20) having an opening (22) for bringing a massaging tool (11) of the massaging section (10) into contact with a user therethrough; an opening cover (23) provided on the front face of the backrest base (20) so as to cover the opening (22) thereof and freely detachably attached to the peripheral edge of the opening (22); and a backrest cover (26) freely detachably attached to the front face of the backrest base (20) so as to cover the front face thereof. The seat portion (3) includes: a seat base (30); a pair of armrest bases (40) provided at both sides, left and right, of the seat base (30); a seat cover (31) freely detachably attached on the top face of the seat base (30) so as to cover the top face; and armrest covers (43) freely detachably attached on both inner side faces of the armrest bases (40) so as to cover both inner side faces While these massage units may be suitable for the purposes for which they were designed, they would not be as suitable for the purposes of the present invention, as hereinafter described.

SUMMARY OF THE PRESENT INVENTION

A primary object of the present invention is to provide a motor vehicle seat having a plurality of massage units that are controllable in sections including neck, back and seat.

Another object of the present invention is to provide a motor vehicle seat having massage units that are controllable by a user positioned within said seat.

Yet another object of the present invention is to provide a massage unit having a rotation member and a vibratory member.

Still yet another object of the present invention is to provide a massage unit having a housing wherein said rotational and vibratory members are extendable to an operative position.

Another object of the present invention is to provide a massage unit wherein said rotational and vibratory members are retracted when in the non-operative position.

Yet another object of the present invention is to provide a massage unit having at least one solenoid for extending and retracting the rotational and vibratory member within said housing.

Additional objects of the present invention will appear as the description proceeds.

The present invention overcomes the shortcomings of the prior art by providing a motor vehicle seat having massage units positioned therein and controllable by each user including neck, back and seat. Each massage unit is comprised of a housing having rotational and vibratory members therein that when energized extend beyond the housing in an operative position. When powered off the rotational and vibratory members retract into the housing.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Vehicle Seat Massage System of the present invention. With regard to the reference numerals used, the following numbering is used throughout the various drawing figures.

10 Vehicle Seat Massage System of the present invention
12 vehicle seat
14 user
16 massage unit
17 massage head
18 control unit
19 massage head assembly
20 neck massage bank
22 back massagebank
24 thigh massage bank
26 housing of 16
28 faceplate of 16
30 track of 28
32 vibration element
34 bracket plate
36 rotation plate
38 motor
40 power source
42 screw
44 solenoid
46 post of 36
48 massage banks
50 vibration element wiring
52 motor wiring
54 junction box
56 control box
60 power button of 18
62 neck massage control button of 18
64 back massage control button of 18
66 thigh massage control button of 18
68 select all massage control button of 18
70 mild massage intensity control button of 18
72 moderate mild massage intensity control button of 18
74 heavy mild massage intensity control button of 18

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
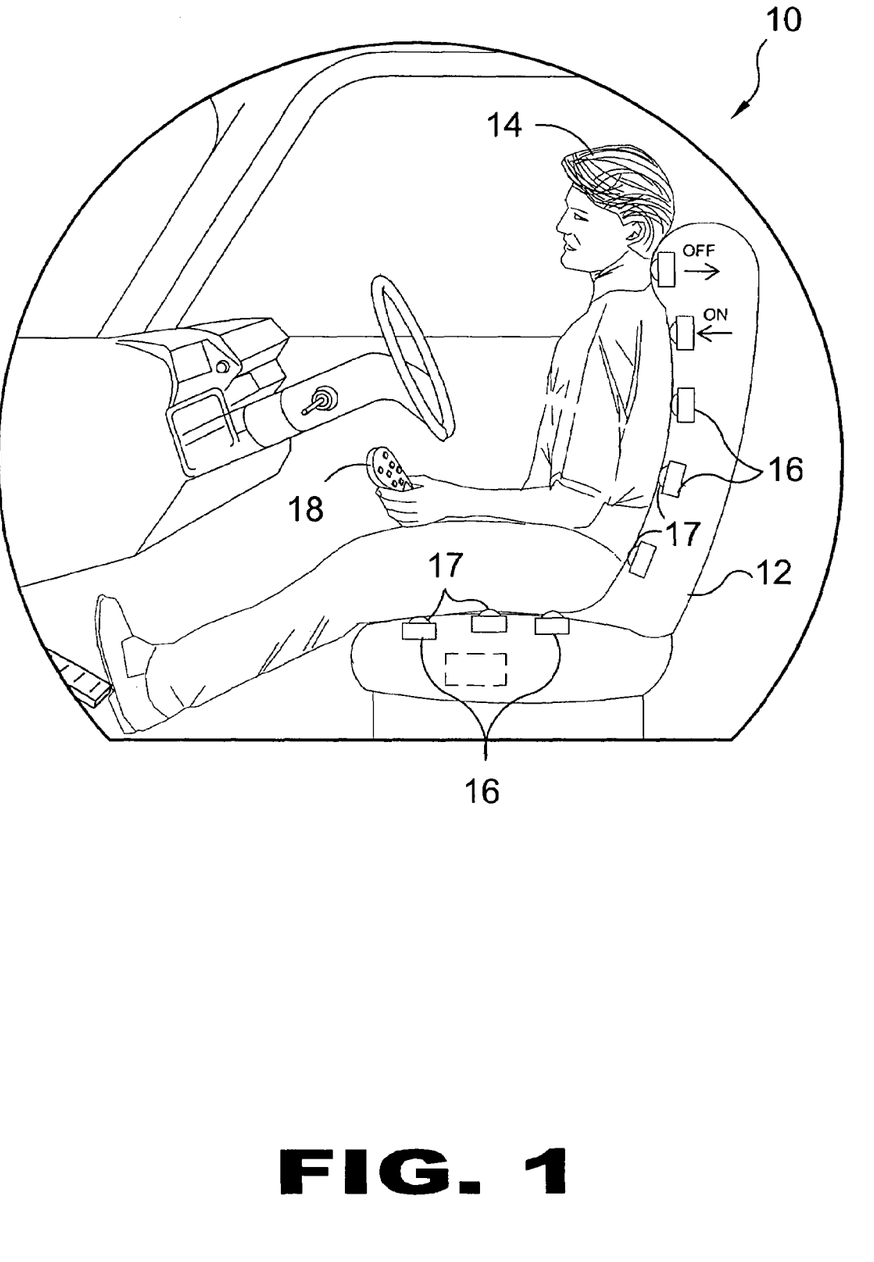
FIG. 1 is an illustrative view of the present invention in use.

FIG. 1 is an illustrative view of the present invention 10 in use. The present invention 10 is a massaging system provided within a vehicle seat 12 that includes a plurality of massage units 16 having motorized vibratory and rotational massaging heads 17 that retract when the system is off and extend towards the user 14 when turned on. Each seat 12 provides a user 14 control unit 18 that may be hand held or stationary.

Figure 2:
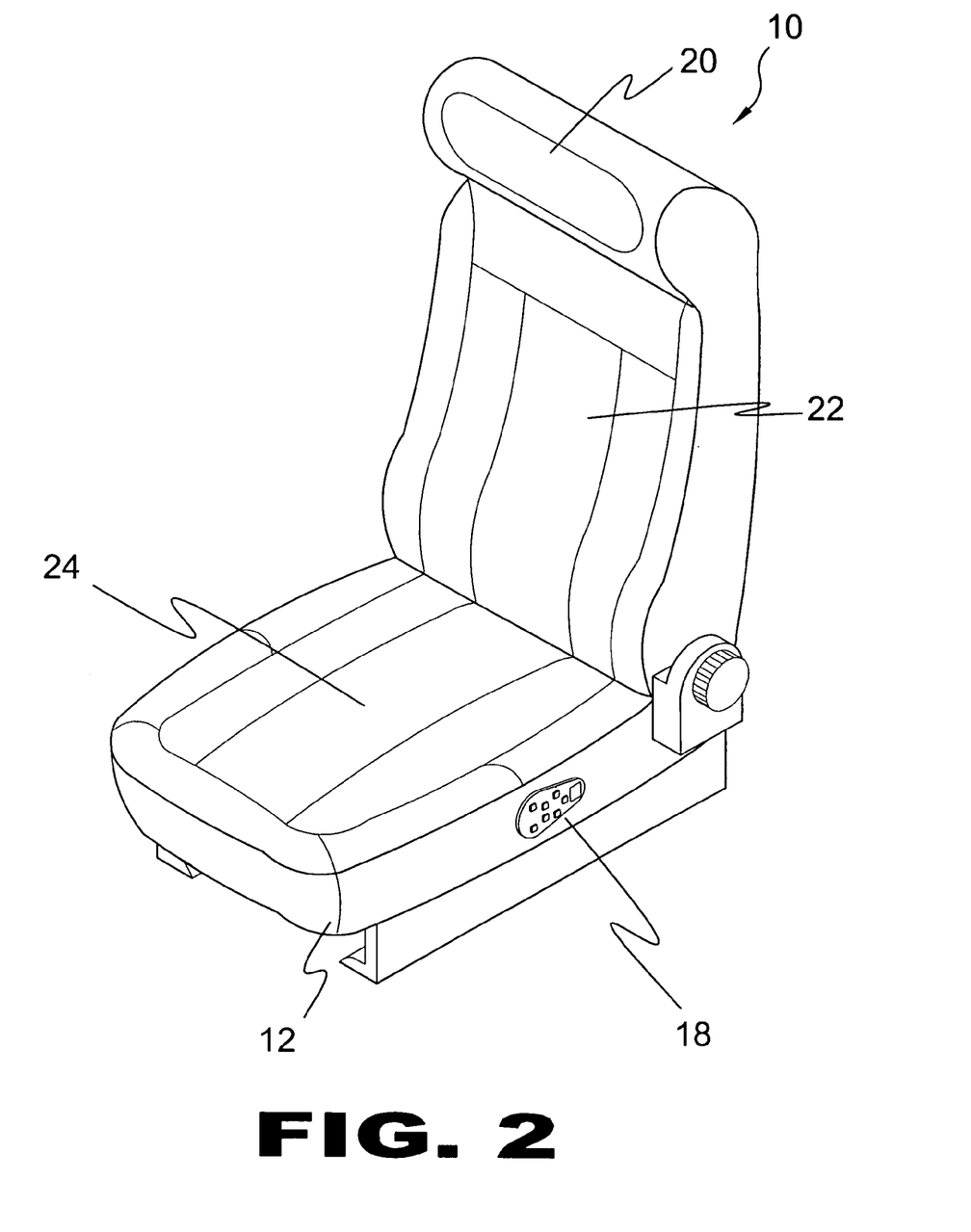
FIG. 2 is a perspective view of the vehicle massage seat of the present invention.

FIG. 2 is a perspective view of the vehicle massage seat 10. Shown is the exterior of the vehicle massaging seat 10. The device employs motorized vibratory and rotational massaging heads that are controlled by a hand held control unit 18 that is stored on the side of the seat. 10. The control unit 18 provides a plurality of speed controls including moderate, mild, heavy, and select massage areas for the neck 20, back 22, seat or thigh 24 or all any selected combination thereof.

Figure 3:
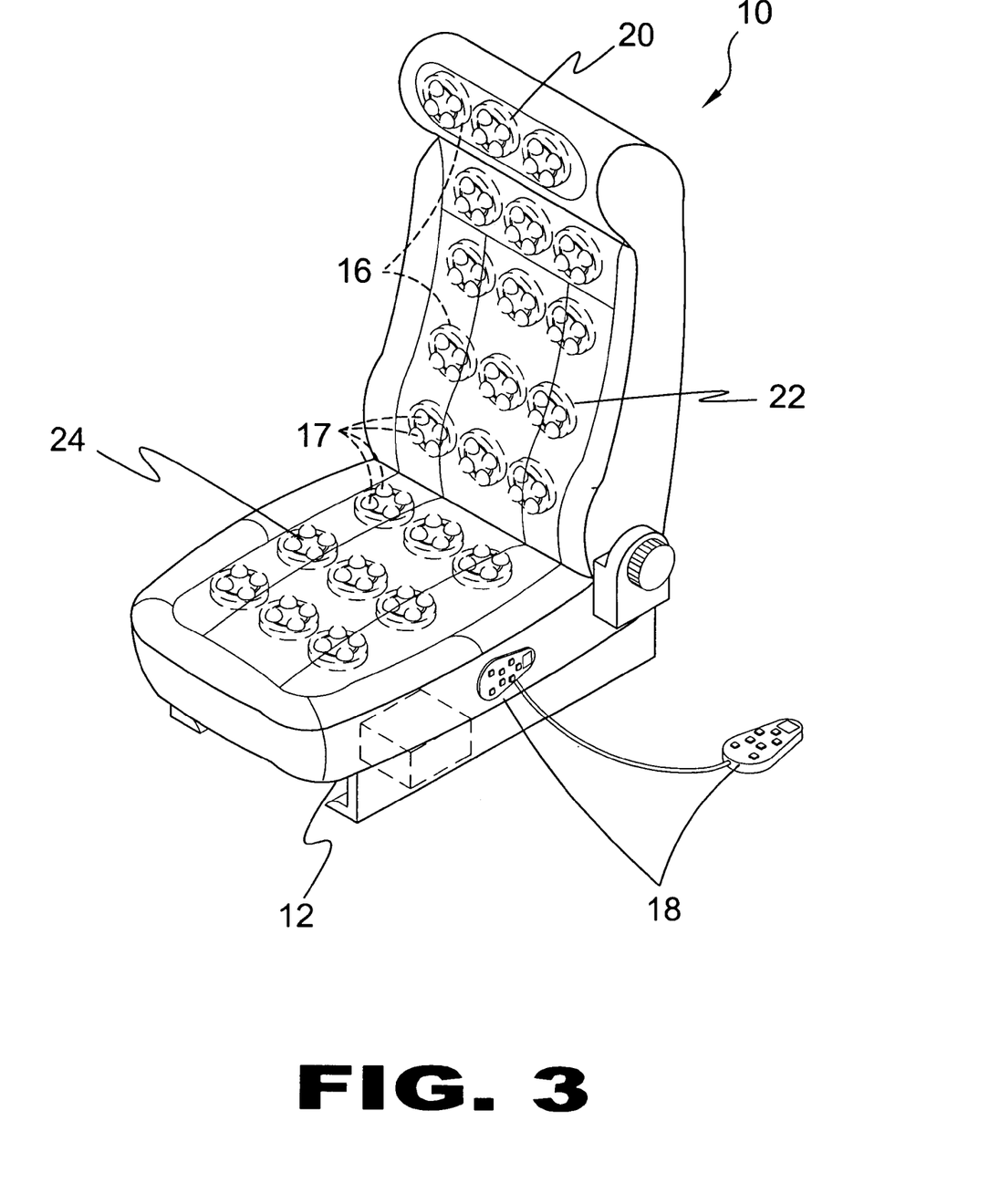
FIG. 3 is a perspective view of the vehicle massage seat of the present invention.

FIG. 3 is a perspective view of the vehicle massage seat 10. Shown is the seat 12 having a plurality of massage units 16 with massaging heads 17 designed to vibrate and rotate at the command of the user. Each seat 12 provides a set of individual massage units for the neck 20, back 22 and thighs 24 and individual control units 18.

Figure 4:
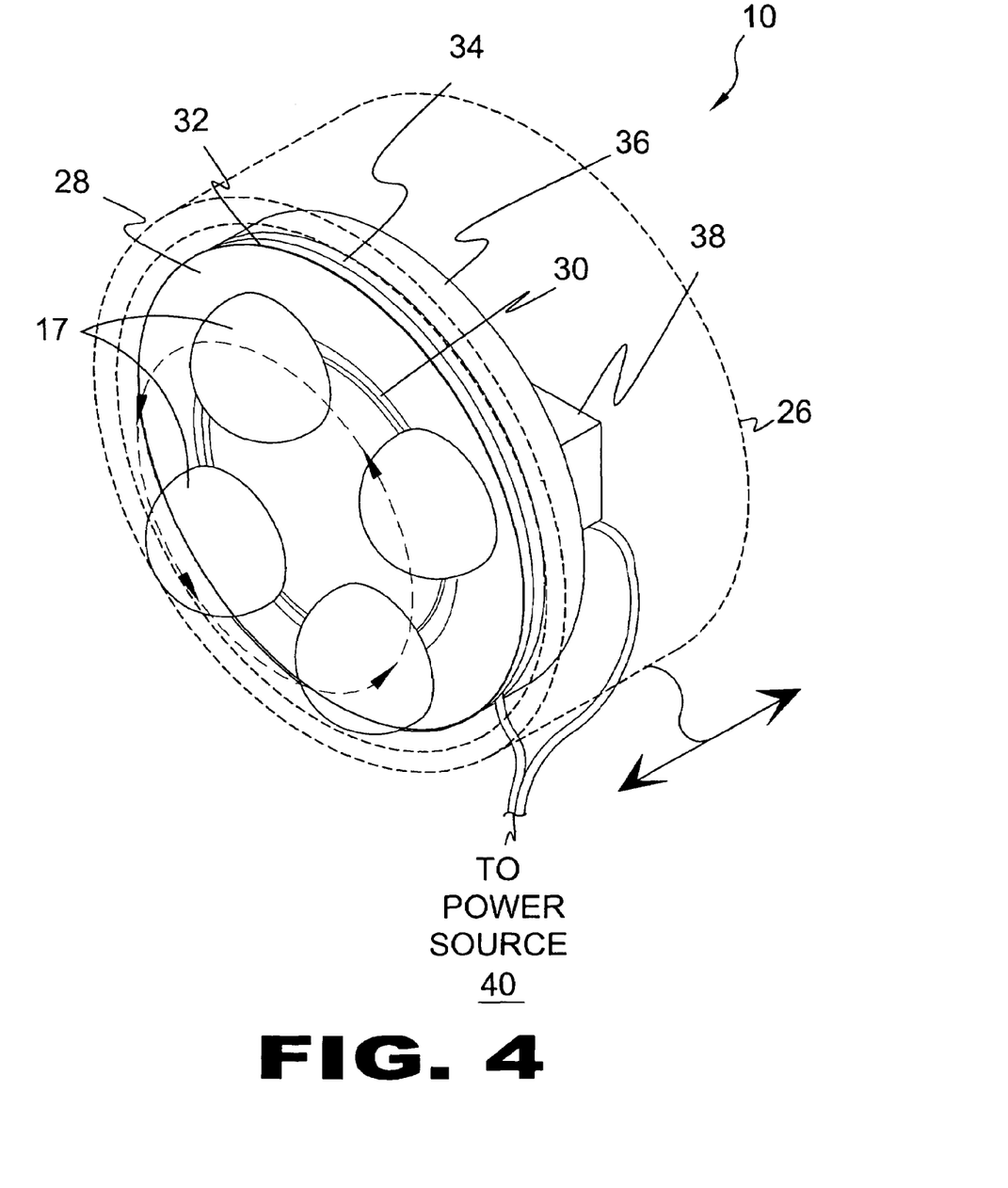
FIG. 4 is a detailed view of the vehicle massage head of the present invention.

FIG. 4 is a detailed view of a massage unit 16. The massage unit 16 comprises a housing 26 with a plurality of massage heads 17 that rotate along a track 30 on a faceplate 28 and mounted to a rotation plate 36 rotated by a motor 38 in electrical communication with a power source 40. The rotation plate 36 is secured to a bracket plate 34 by a plurality of screws 42 and a vibration element 32 is sandwiched between bracket plate 34 and the faceplate 28.

Figure 5:
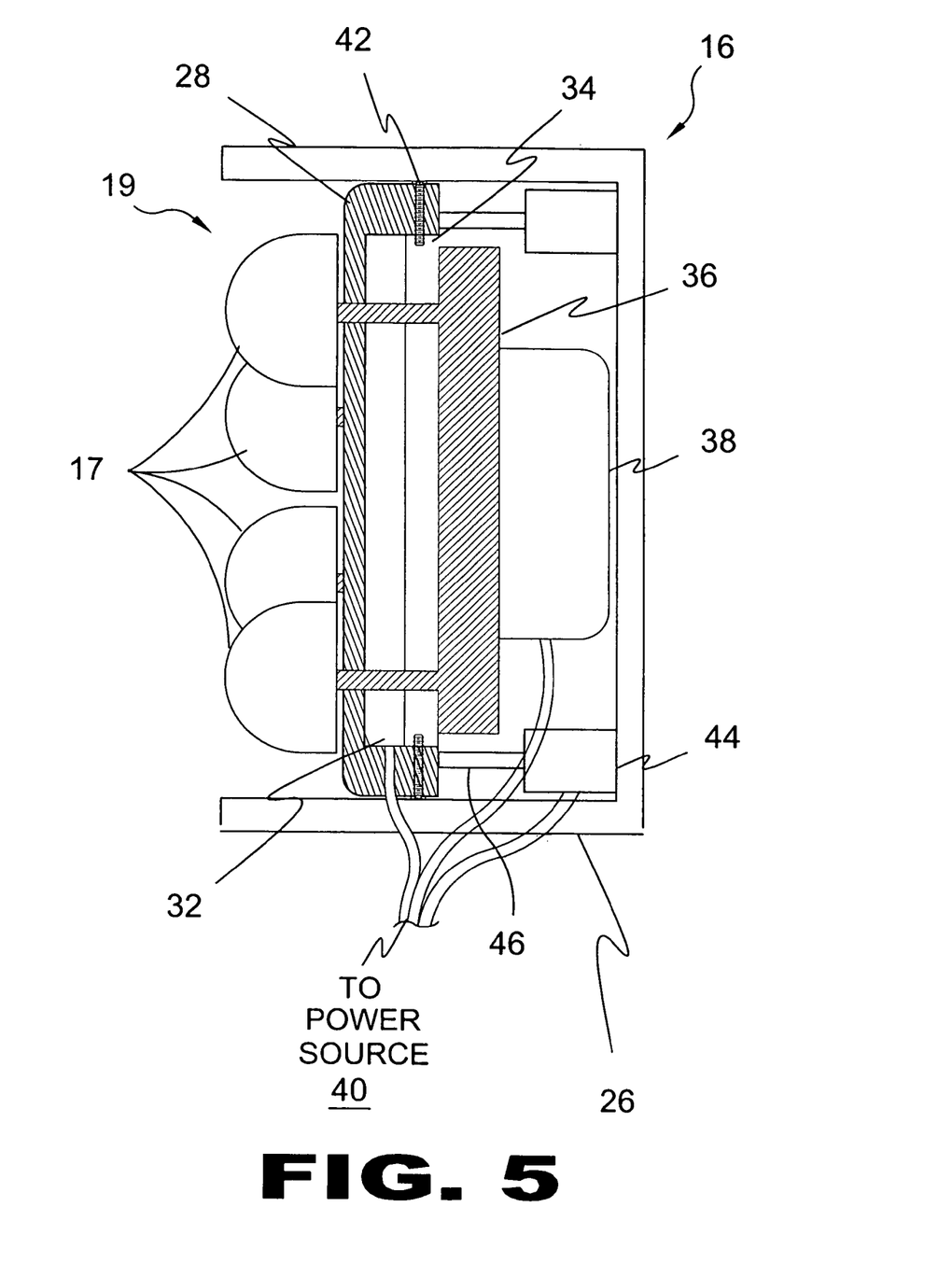
FIG. 5 is a sectional view of the vehicle massage head in the retracted position.

FIG. 5 is a sectional view of the vehicle massage unit 16 in the retracted position. The massage unit 16 comprises a housing 26 with a plurality of massage heads 17 that rotate along a track 30 on a faceplate 28 and are mounted on a rotation plate 36 rotated by a motor 38 in electrical communication with a power source 40. The entire massage head assembly 19 will be advanced beyond the housing 26 by solenoid 44 once power 40 is applied thereto. The massage heads 17 are mounted on posts 46 extending from the rotation plate 36. The rotation plate 36 is secured to a bracket plate 34 by a plurality of screws 42 and a vibration element 32 is sandwiched between bracket plate 34 and the faceplate 28.

Figure 6:
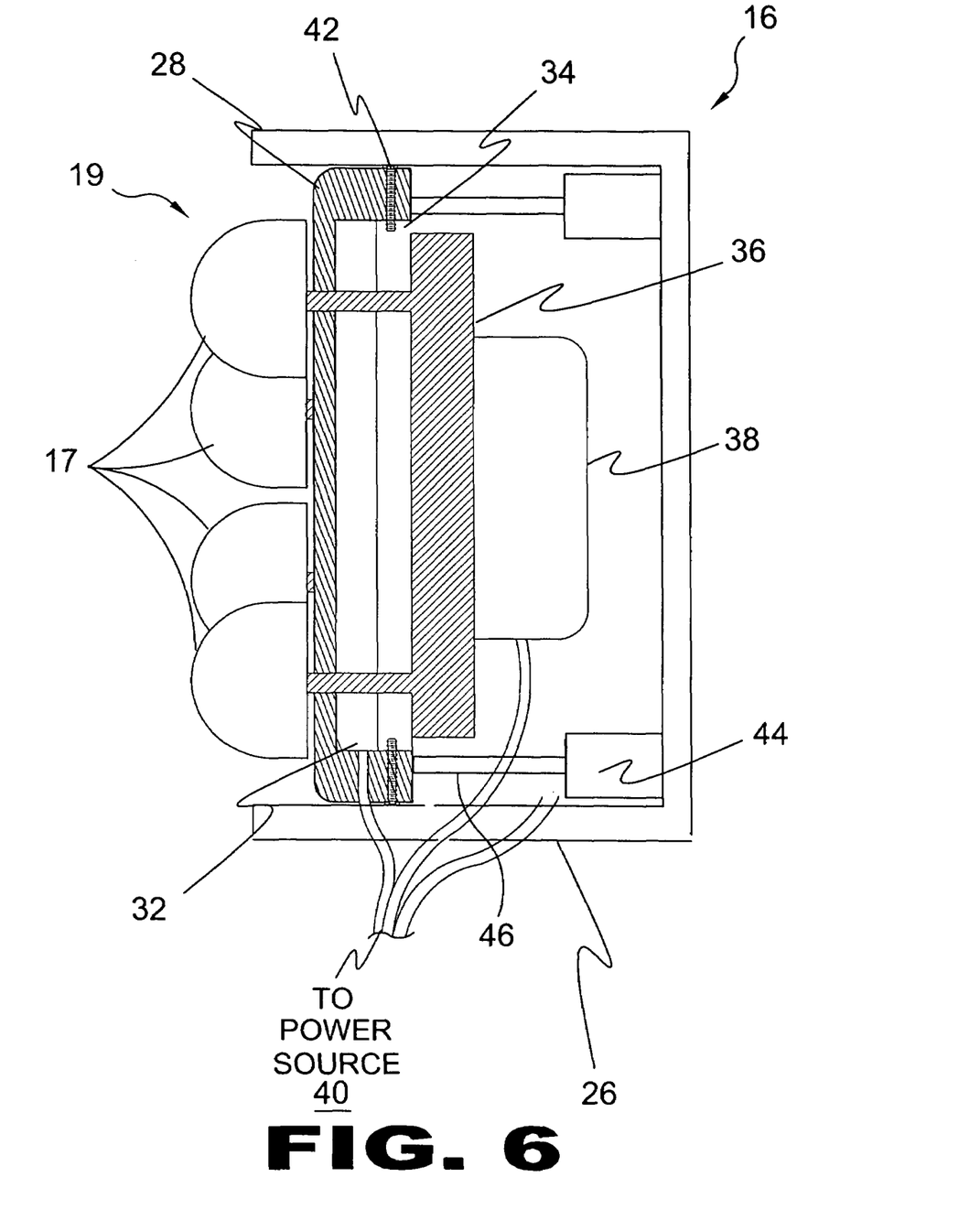
FIG. 6 is a sectional view of the vehicle massage head in the extended position.

FIG. 6 is a sectional view of the vehicle massage unit 16 in the extended position. The massage unit 16 comprises a housing 26 with a plurality of massage heads 17 that rotate along a track 30 on a faceplate 28 and are mounted on a rotation plate 36 rotated by a motor 38 in electrical communication with a power source 40. The entire massage head assembly 19 will be retracted into the housing 26 by solenoids 44 once power 40 is removed therefrom. The massage heads 17 are mounted on posts 46 extending from the rotation plate 36. The rotation plate 36 is secured to a bracket plate 34 by a plurality of screws 42 and a vibration element 32 is sandwiched between bracket plate 34 and the faceplate 28.

Figure 7:
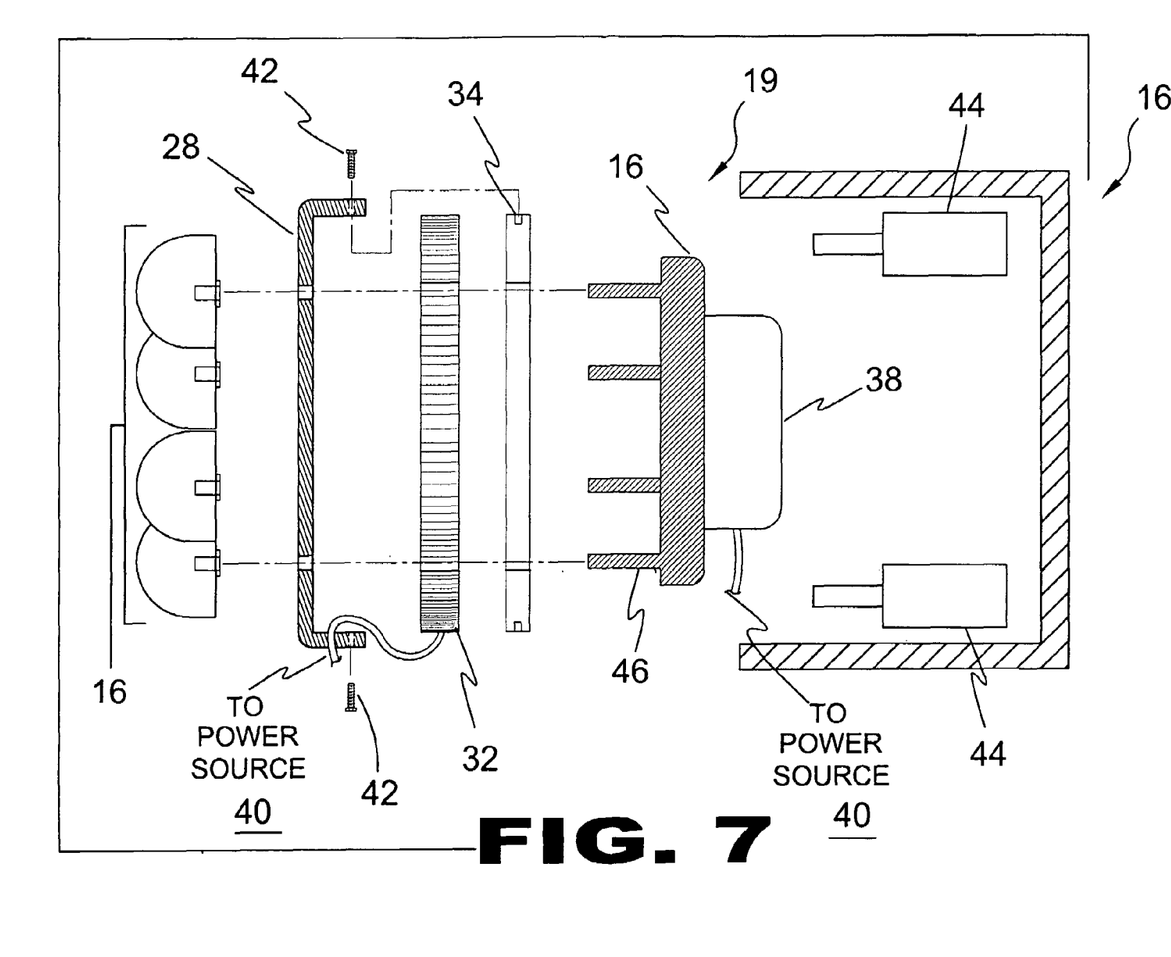
FIG. 7 is an exploded sectional view of the vehicle massaging seat of the present invention.

FIG. 7 is an exploded sectional view of the massage unit 16. The massage unit 16 comprises a housing 26 with a plurality of massage heads 17 that rotate along a track 30 on a faceplate 28 and are mounted on a rotation plate 36 rotated by a motor 38 in electrical communication with a power source 40. The entire massage head assembly 19 will be retracted or extended accordingly into the housing 26 by solenoids 44 once power 40 is removed therefrom or applied thereto. The massage heads 17 are mounted on posts 46 extending from the rotation plate 36. The rotation plate 36 is secured to a bracket plate 34 by a plurality of screws 42 and a vibration element 32 is sandwiched between bracket plate 34 and the faceplate 28.

Figure 8:
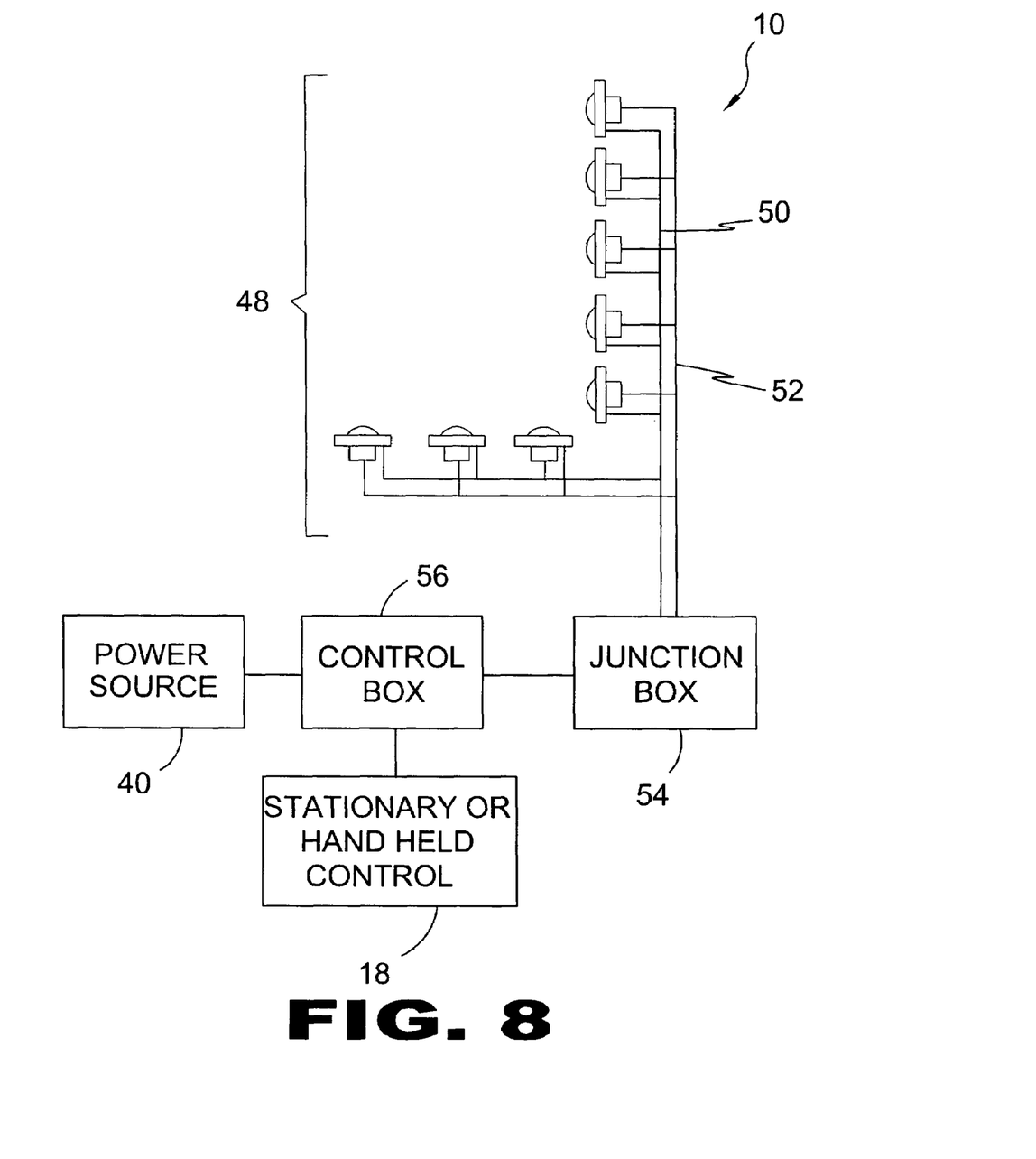
FIG. 8 is a flow chart view of the vehicle massage seat of the present invention.

FIG. 8 is a flow chart view of the vehicle seat massage system 10. The present invention is a massaging system 10 provided within a vehicle seat that includes massaging banks 48, vibration element wiring 50, rotation element wiring 52, a junction box 54, a control box 56, a power source 40 and a control unit 18.

Figure 9:
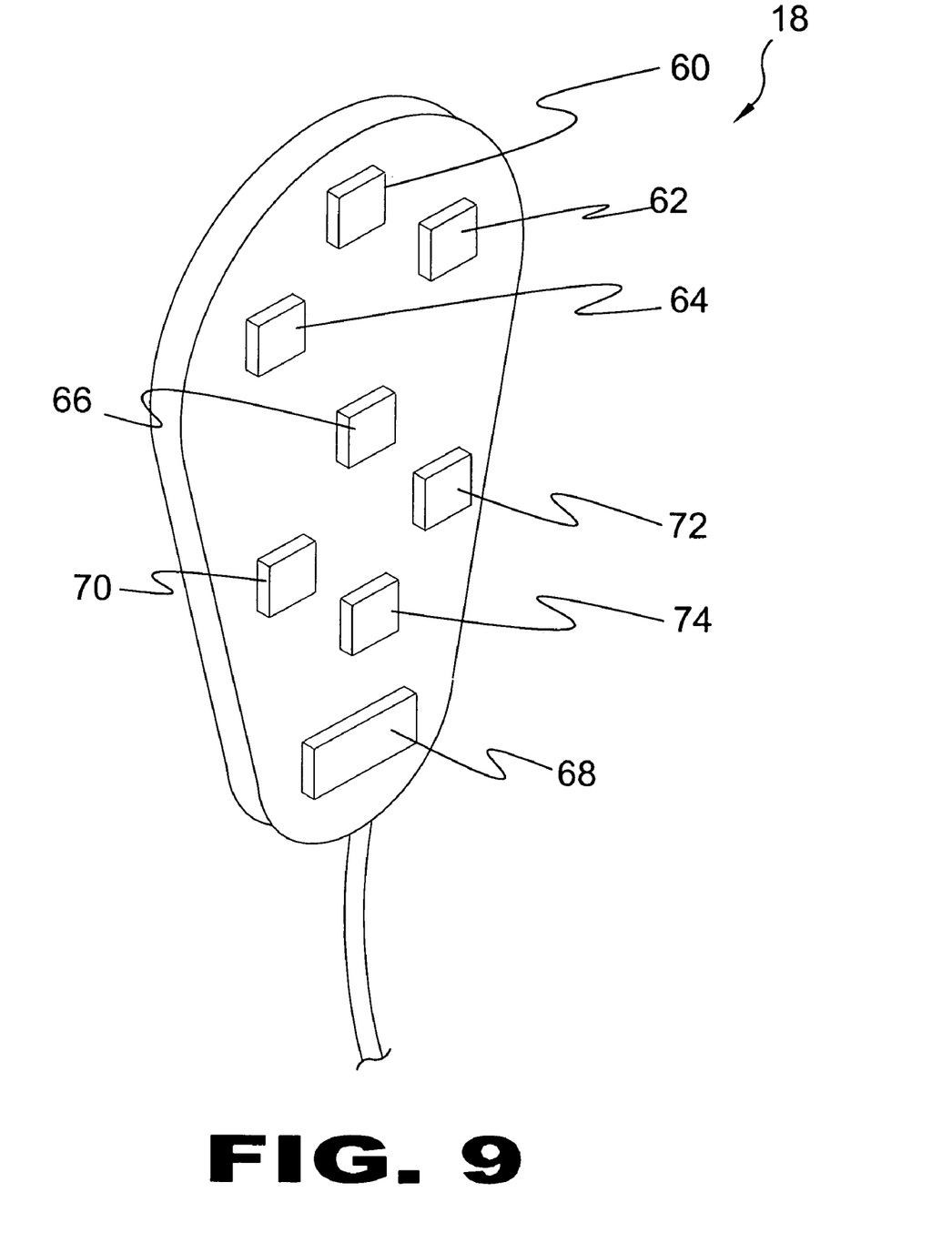
FIG. 9 is a detailed view of the control unit for the vehicle massage seat of the present invention.

FIG. 9 is a detailed view of the control unit 18 of the present invention. The control unit 18 be stored along the side of the seat and removed from that position to remotely activate and control the massaging effect or deactivate when not required. Other hand held control units 18 may be disposed in other appropriate locations. Stationary control units 18 may be disposed on the dashboard, visor, console or steering wheel among other suitable locations. This figure illustrates just one possible configuration of the control unit 18 comprising a power button 60, a neck bank control button 62, a back bank control button 64, a thigh bank control button 66, a select all button 68, a mild massage intensity button 70, a moderate massage intensity button 72 and a heavy massage intensity button 74.

Figure 10:
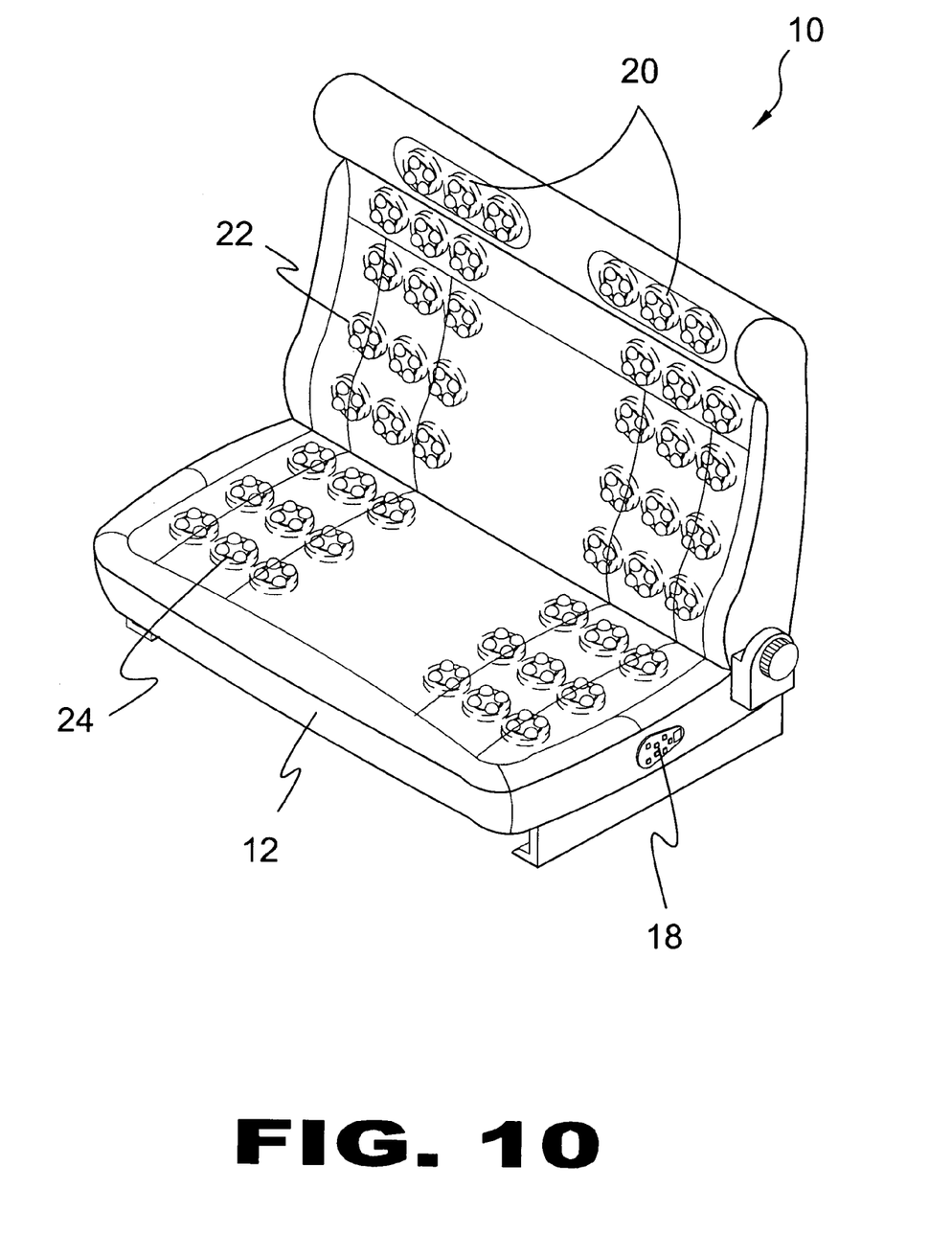
FIG. 10 is a perspective view of a bench seat having the vehicle massage system of the present invention.

FIG. 10 is a perspective view of a bench seat having the vehicle massage system of the present invention. The massaging system of the present invention can also be provided in bench seats such as back seats of vehicles. Each seating position is provided with individual control units.

Figure 11:
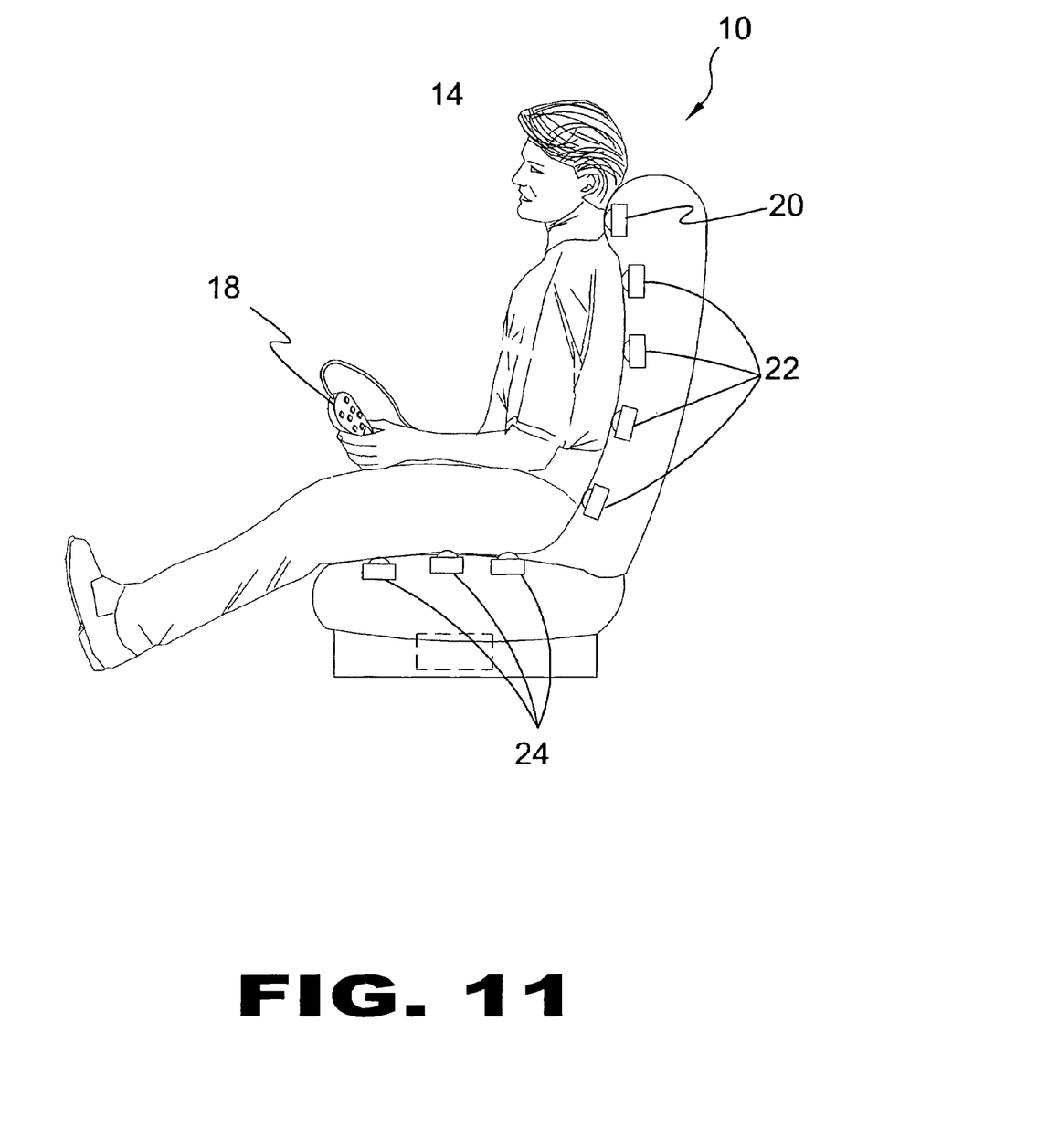
FIG. 11 is a side view of the vehicle massage system of the present invention in use.

FIG. 11 is a side view of the vehicle massage system of the present invention in use. The present invention provides a vehicle massaging seat that includes motorized vibratory and rotational massaging heads that are controlled by a user with a hand held control unit.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A vehicle seat massage system to provide relaxing and therapeutic massage to the driver and passengers in a motor vehicle, said massage system comprising:
    a) a plurality of massage units incorporated within said vehicle seats;
    b) a massage head assembly integral with each said massage unit wherein said massage head assembly extends towards the occupant of the seat when in use and retracts when not in use;
    c) a plurality of massage heads disposed on said massage head assembly that vibrate and rotate to provide the massaging action to the user;
    d) a user control unit to enable, disable and control the action of said massage units;
    e) a power source and
    wherein said massage unit comprises:
    f) a housing;
    g) a motor; and
    h) at least two solenoids secured at a first end to said housing and at a second end to said massage head assembly; and
    wherein said massage head assembly comprises:
    i) a rotation plate with a plurality of posts projecting therefrom;
    j) a bracket plate in face-to-face relation with said rotation plate, said bracket plate having a substantially open center to allow the passage of said posts therethrough;
    k) a vibration element in face-to-face relation with said bracket plate,
    l) a faceplate having side walls depending therefrom to effectively encase said vibration element and said bracket plate therein;
    m) a circular grooved slot in said faceplate to allow said posts to pass therethrough and rotate therearound; and
    wherein one of said massage heads is disposed on the distal end of each said rotation plate post.

2. The vehicle seat massage system as recited in claim 1, wherein said massage units are positioned in said seat to afford massage to the neck, back and thighs of the occupant thereof.

3. The vehicle seat massage system as recited in claim 2, wherein said neck, back and thigh massage units are each operated in independent massage banks to allow the user to receive just the neck, back or thigh massage or any combination thereof.

4. The vehicle seat massage system as recited in claim 3, further including a junction box to receive the circuitry from the massage units of the massage banks of the respective seat.

5. The vehicle seat massage system as recited in claim 4, further including a control box in electrical communication between said junction box and said power source.

6. The vehicle seat massage system as recited in claim 5, wherein said control unit is in communication with said control box thus enabling the user to selectively deliver power to the desired massage banks.

7. The vehicle seat massage system as recited in claim 1, wherein said solenoids are in electrical communication with said power source.

8. The vehicle seat massage system as recited in claim 1, wherein said vibration element is in electrical communication with said power source.

9. The vehicle seat massage system as recited in claim 1, wherein said motor is in electrical communication with said power source.

10. The vehicle seat massage system as recited in claim 9, wherein the user activates said massage units of the selected massage bank with the control unit thereby supplying power to the respective massage units.

11. The vehicle seat massage system as recited in claim 10, wherein the power received by said massage unit activates said solenoids which then extend thereby extending said massage assembly until said massage heads project beyond said housing.

12. The vehicle seat massage system as recited in claim 11, wherein the power received by said massage unit activates said motor to rotate said rotation plate and its associated massage heads.

13. The vehicle seat massage system as recited in claim 12, wherein the power received by said massage unit activates said vibration element thereby transferring the vibrations to said massage heads.

14. The vehicle seat massage system as recited in claim 13, wherein the removal of power to said massage unit deactivates said vibration element.

15. The vehicle seat massage system as recited in claim 14, wherein the removal of power to said massage unit deactivates said motor.

16. The vehicle seat massage system as recited in claim 15, wherein the removal of power to said solenoids thereby retracting said massage head assembly until said massage heads are fully disposed within said housing.

17. The vehicle seat massage system as recited in claim 1, wherein said control unit is hand-held.

18. The vehicle seat massage system as recited in claim 1, wherein said control unit is stationary.

19. The vehicle seat massage system as recited in claim 18, wherein said control unit comprises:

a) a power on/off button;

b) a neck bank control button;

c) a back bank control button:

d) a thigh bank control button;

e) a select all button;

f) a mild massage intensity control button;

g) a moderate massage intensity control button; and h) a heavy massage control unit.

* * * * *